Nov. 1, 1932.  A. O. AUSTIN  1,885,317

TRANSMISSION LINE SUPPORT

Filed Feb. 15, 1929

Inventor
Arthur O. Austin.

By Alpheus J. Crane
Attorney

Patented Nov. 1, 1932

1,885,317

UNITED STATES PATENT OFFICE

ARTHUR O. AUSTIN, OF NEAR BARBERTON, OHIO, ASSIGNOR, BY MESNE ASSIGNMENTS, TO THE OHIO BRASS COMPANY, OF MANSFIELD, OHIO, A CORPORATION OF NEW JERSEY

TRANSMISSION LINE SUPPORT

Application filed February 15, 1929. Serial No. 340,225.

This invention relates to supports for transmission lines and has for one of its objects the provision of a support which will offer considerable initial resistance to movement in the direction of the length of the line but will yield to a force in that direction when it exceeds a predetermined amount.

Another object is to provide a support for a wood cross arm which will yield to a predetermined force in the direction of the line less than that required to break the cross arm.

Another object of the invention is to provide a support for a cross arm which will permit the cross arm to adjust itself so as to effectively meet changes in the forces to which it is subjected.

Another object is to provide a transmission line support which shall be of improved construction and operation.

Other objects and advantages will appear from the following description.

The invention is exemplified in the combination and arrangement of parts shown in the accompanying drawing and described in the following specification, and it is more particularly pointed out in the appended claims.

Figure 1:
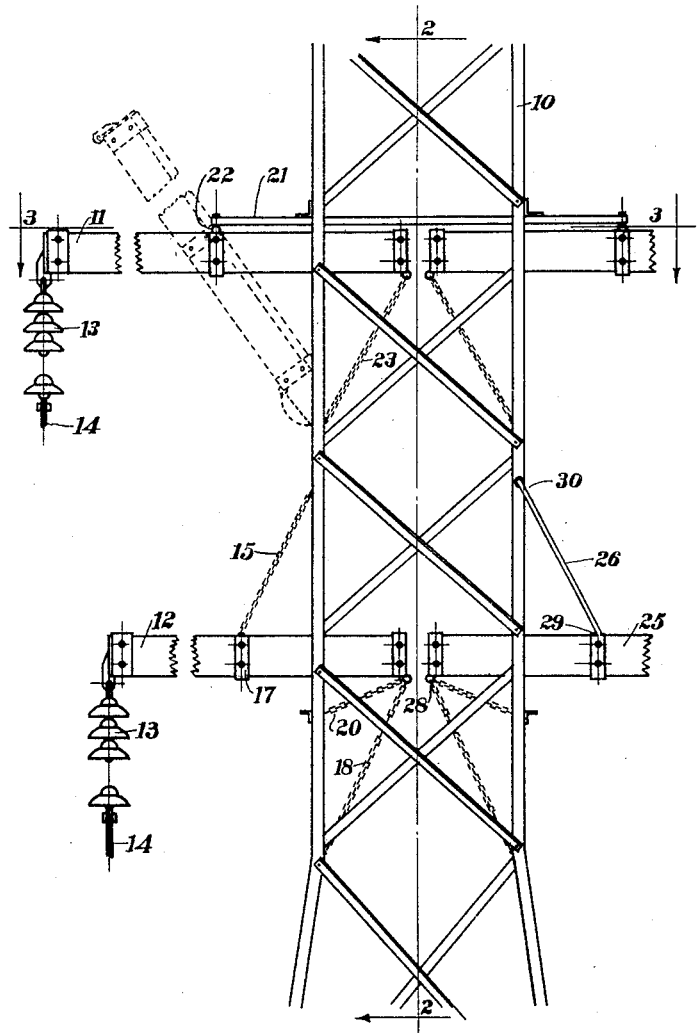
Fig. 1 is a fragmentary elevation of a conductor tower having the present invention applied thereto.
Figure 2:
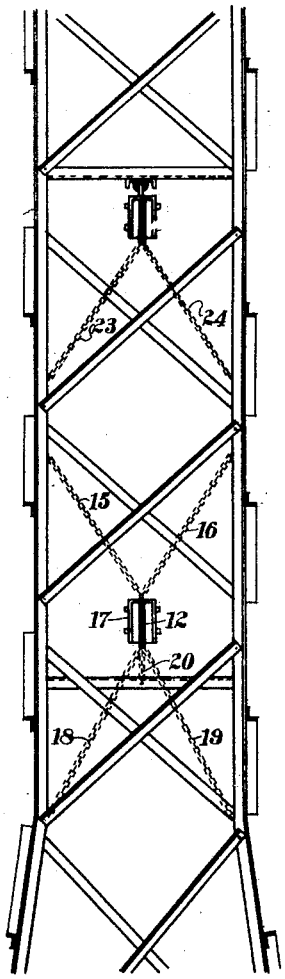
Fig. 2 is a vertical section in line 2—2 of Fig. 1.

Supports for high tension transmission lines are frequently subjected to abnormal mechanical stresses due to unbalanced loading of the line. So long as the tension on a line is the same at both sides of its attachment to a cross arm these forces balance each other and it is only necessary for the support to carry the vertical load of the line. If, however, the line should break at one side of the support, the cross arm and tower will be subjected to heavy force in the direction of the line which may break the cross arm or twist or break the tower. If the cross arm, under such conditions be permitted to swing in the direction of the unbalanced force, the effect is reduced and the arm is placed in better position to withstand the added force. On the other hand, if a cross arm is free to respond to every slight unbalanced loading, it becomes unstable and objectionable for that reason.

In the improved type of arm construction comprised in the present invention, the cross arm has considerable stability and does not yield to an unbalanced load until the deflecting force reaches a predetermined amount. This excessive deflecting force may be accasioned by a break in the conductor or unequal loading on adjacent spans or other causes. It is desirable to maintain a stable condition in the cross arm to facilitate construction and repairs, but it is also desirable to permit the arm to rotate in the general longitudinal direction of the conductor when an unbalanced load would otherwise destroy the arm.

Since arms may be readily made which are much stronger in tension than in bending moment, it is desirable to permit the arm to move in the general direction of the force exerted by the conductor. It is, however, not advisable to permit a swinging of the arm until a dangerous force is exerted, as unnecessary movement in the arm tends to cause conductors to deflect so that phase to phase shorts may result.

While the construction is applicable to cross arms made either of steel, wood or other suitable material, it is particularly applicable for wood cross arms owing to the fact that the stresses may be materially limited which might otherwise prevent the use of wood arms. In many installations it is particularly advisable to use wood arms as the flashover voltage for disturbances produced by lightning may be greatly increased by the use of a wood arm over a steel or other form of conducting arm. The construction is applicable to many existing lines as, by changing portions of the supporting mechanism, towers now having steel arms may have same replaced by the improved wood arm, adding greatly to the effective insulation so as to prevent flashovers with resulting interruptions to service.

In the form of the invention illustrated, the cross arm 12 is supported from the tower by chains or links 15 and 16 attached to horizontally spaced portions on the tower and to a suitable strap or collar 17 on the cross arm. The rear end of the cross arm is held down by chains or links 18 and 19 having spaced attachments to the tower at their lower ends. A further chain or link 20 normally in the central vertical plane of the cross arm is usually advisable as this controls the location of the arm transversely with respect to the transmission line and provides greater range for the relative angles between the links 15 and 16, and 18 and 19 with respect to the face of the tower. While the link 20 may be omitted, it is evident that the cross arm would then be free to move normal to the direction of the line with a change of load due to wind or other means. Where the angles of the main supporting links 15 and 16, and 18 and 19 are such that a considerable tension may be placed upon 20 to hold the arm in its normal position, a considerable unbalanced load transverse to the line can be provided for before deflection will take place. When an unbalanced load of a predetermined magnitude occurs, the arm will be deflected in the direction of the line and where attaching links are suitably placed both as to relative location and length, the arm may at the same time be given a general rotating movement about its longitudinal axis. This rotary movement keeps the arm disposed so that its greatest strength opposes the bending movement on the arm.

In many towers it is possible for the rear end of the arm to swing free of the tower when a heavy unbalanced load occurs. In most transmission lines it is advisable to offset the conductors so that an unbalanced load will not permit the conductors to come together, particularly under snow or sleet conditions. Cross arms supported according to the present invention, having a very considerable amount of stability, are particularly applicable for this class of work as against freely swinging arms.

It is evident that if the arm 11 were free to swing easily under an unbalanced load, due to the dropping of sleet on one side of the structure, the conductor would not only be lowered but would move inwardly at the same time so that the conductor 14 supported from the upper arm would tend to come into contact with the conductor for the phase below. In the improved construction, however, it is possible to prevent movement of the arm until a very heavy unbalanced load occurs.

Since wood cross arms are costly to construct where the vertical loads are heavy and the length of arm is long, a different type of support may be used in the case of the upper arm 11 to reduce the length of arm projecting beyond its support. It is evident, however, that the construction used for supporting the lower arm 12 makes it possible to reduce very materially the length of arm projecting from the tower beyond its support. For supporting the arm 11, a suitable steel member 21 is fastened to the body of the tower and provided with a swivel connection at 22 for attachment to the arm 11. This means of support fixes the arm against any movement transverse to the conductors. The point of support at 22 is also fixed against movement in other directions. The links 23 and 24, similar to links 18 and 19, are used to hold the lower end of the arm down and also to restrain the movement of the cross arm in the general direction of the conductors. It is evident that by attaching the links at the proper points the cross arm may be given a considerable amount of stability in the direction of the line. Where the links are of suitable length it is also possible to deflect the rear of the arm downwardly when it is rotated on its swivel 22 in such a manner that it will clear the tower member. This will also lift the outer end of the arm and tend to return the arm to normal position upon release or reduction of the unbalanced load in the direction of the line. This arrangement permits the arm to tilt as shown in broken lines in Fig. 3 to better resist the stress upon the cross arm which might otherwise cause damage and, at the same time, permits the arm to clear the tower.

Figure 3:
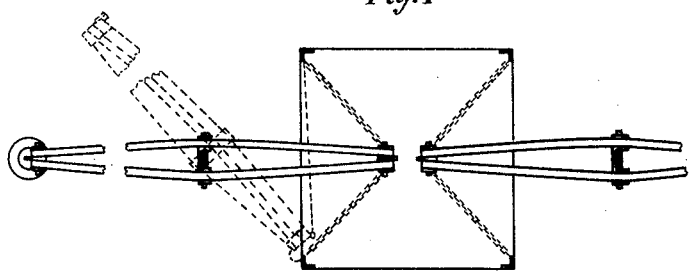
Fig. 3 is a horizontal section on line 3—3 of Fig. 1.

The cross arm is shown in deflected position in the dotted lines in Figs. 1 and 3. While the cross arm 12 is shown supported by flexible links such as chains, it is possible to use stiff links which will prevent rocking of the cross arm for limited loads in the direction of the line but which will bend and act in general similarly to the flexible links when subjected to excess load. The fact that the links would be bent upon movement of the arm is not at all serious as this type of arm will not move except under an abnormal condition which might otherwise wreck the line. All links may be formed of stiff members which will bend under excess load or a portion only need be members of this kind. Cross arm 25 is shown provided with stiff links 26 and 27. These links will readily twist or deform when the predetermined unbalanced load is reached but, on the other hand, will prevent any slight rotation of the arm about the holding points 28 and 29. In general, the links will be rigidly attached to the arm 25 and will have a link permitting universal movement at the point 30 of attachment to the tower. This, in general, will provide a sufficiently rigid arm to facilitate installation of insulators and conductors as any rotation which would tend to prevent climbing out on the arm will be overcome.

I claim:

1. In combination a supporting structure, a cross arm projecting from said structure, a transmission line carried on the projecting portion of said cross arm, a swinging suspension member for supporting said cross arm on said structure, and a tension member connecting said structure and cross arm and arranged to hold said cross arm outwardly relative to said structure and to hold said suspension member in an inclined position relative to the vertical.

2. In combination a supporting structure, a pair of flexible members secured to said structure in horizontally spaced relation to each other, a cross arm suspended by said flexible members, a transmission line carried by said cross arm at one side of the connection between said cross arm and said flexible members and a tension member secured to said cross arm at the opposite side of said connection, from said transmission line, to hold said cross arm from tilting under the weight of said transmission line.

3. In combination a supporting structure, a suspension member secured to said structure, a cross arm supported by said suspension member, a transmission line mounted on said cross arm and a tension member connecting said cross arm and said supporting structure and arranged to hold said cross arm outwardly away from said supporting structure so as to hold said suspension member in an outwardly inclined position.

4. In combination a supporting structure, a pair of flexible suspension members connected with said structure in horizontal spaced relation to each other, a cross arm supported by said suspension members and projecting outwardly from said supporting structure, an insulator mounted on the outer end of said cross arm, a transmission line carried by said insulator, a pair of flexible stays secured to the inner end of said cross arm and connected to said supporting structure at horizontally spaced points, and a third flexible member secured to the inner end of said cross arm and to said supporting structure, said third flexible member being arranged substantially in the central vertical plane of said cross arm when said cross arm is in normal position.

5. In combination a supporting tower having an opening through the side thereof, a cross arm projecting through said opening and mounted to swing laterally relative to said tower, and means for swinging the inner end of said cross arm downwardly when said cross arm is swung laterally to permit said inner end to clear said tower.

6. The combination with a transmission tower, of an arm for supporting the transmission lines, said arm comprising a beam pivotally connected at one end to the tower at a point appreciably below the upper end thereof, a pair of truss bars fixedly connected at transversely spaced points to the upper end of said tower and to the opposite sides of said beam at points intermediate the length of said beam, said truss bars being adapted to normally hold said beam against swinging movement about its pivotal mounting under normal loads and being yieldable to permit swinging of said beam under abnormal loads.

7. The combination with a transmission tower, of arms extending outwardly from opposite sides of said tower in a direction transverse to the line to support the transmission line cables, each of said arms comprising a beam pivotally connected at one end to the tower at a point appreciably below the upper end thereof, a pair of truss bars fixedly connected at transversely spaced points to the upper end of said tower and to the opposite sides of said beam, the points intermediate the length of said beam, said truss bars being adapted to normally hold said beam against swinging movement about its pivotal mounting under normal loads and being yieldable to permit swinging of said beam under abnormal loads.

8. The combination with an upright supporting structure, of a cross arm pivotally mounted on said supporting structure, a transmission line carried by said cross arm, and truss members connecting said cross arm with said supporting structure and adapted to tilt said cross arm vertically when said cross arm is swung horizontally on its pivotal support.

In testimony whereof I have signed my name to this specification this 14th day of February A. D. 1929.

ARTHUR O. AUSTIN.